United States Patent
Westlin et al.

[15] 3,659,719
[45] May 2, 1972

[54] FILTER FRAME CONSTRUCTION

[72] Inventors: Karl L. Westlin; Wilson A. Welch, both of Louisville, Ky.

[73] Assignee: American Air Filter Company, Inc., Louisville, Ky.

[22] Filed: Dec. 7, 1970

[21] Appl. No.: 95,508

[52] U.S. Cl.......................210/483, 210/493, 55/497, 55/500, 55/501, 55/DIG. 31
[51] Int. Cl.......................................................B01d 46/52
[58] Field of Search..............210/483, 493, 485; 55/DIG. 31, 55/497, 499, 500, 501, 511

[56] References Cited

UNITED STATES PATENTS

| | | | |
|---|---|---|---|
| 3,154,393 | 10/1964 | Klein et al. | 55/DIG. 31 |
| 1,598,097 | 8/1926 | Mathis | 55/DIG. 31 |
| 2,952,342 | 9/1960 | Schnittker | 55/DIG. 31 |

Primary Examiner—Samih N. Zaharna
Assistant Examiner—Fredrick F. Calvetti
Attorney—Ralph B. Brick and Charles G. Lamb

[57] ABSTRACT

A filter assembly including a filter frame with filter medium disposed therein and a border flange arranged to engage the edge of the filter frame, the border flange being clamped to the frame by resilient means inserted between the filter frame and the flange.

4 Claims, 7 Drawing Figures

Patented May 2, 1972  3,659,719

*INVENTOR.*
KARL L. WESTLIN
WILSON A. WELCH

BY Ralph L. Buck

Patented May 2, 1972
3,659,719
2 Sheets-Sheet 2
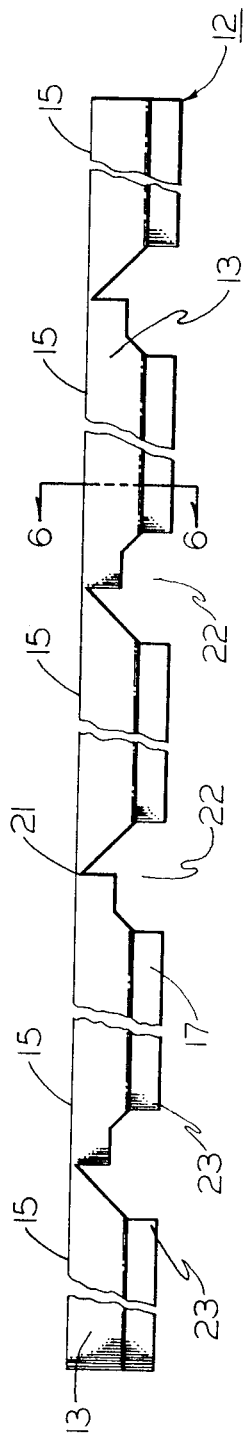
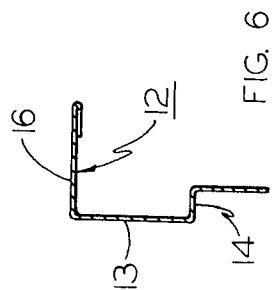
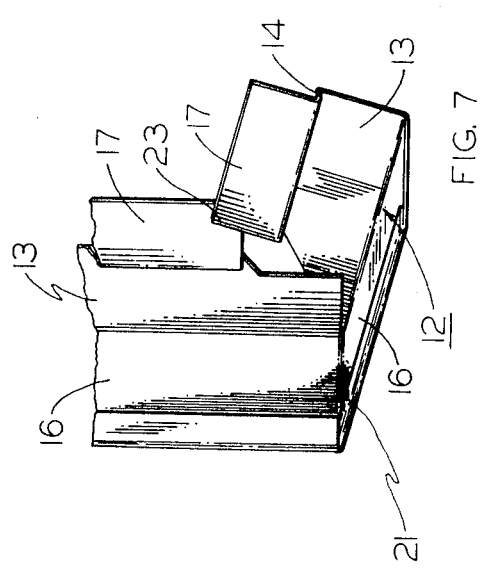
INVENTOR.
KARL L. WESTLIN
WILSON A. WELCH
BY Ralph C. Buck

FILTER FRAME CONSTRUCTION

BACKGROUND OF THE INVENTION

The present invention relates to filter assembly construction and more particularly to a border flange arrangement for engaging with the filter frame edge.

In the art of fluid filtration, it is desirable to mount fluid treating filter medium into a sturdy frame which can be readily handled during operation and storage. It further is desirable that such a frame presents a minimum of sharp corners to reduce problems of cutting and tearing. These filter frame attributes are particularly desirable where filter medium of considerable depth is utilized, such as in filter constructions where the filter medium extends back and forth in pleated fashion across the fluid stream to be treated with the walls of the pleats of filter medium being held in spaced relation from each other by spacer members. Such type of filter constructions are most commonly used for high efficiency filtration with the frames often being made of rigid, non-metallic materials. With frames of this nature, it not only is important that the frame construction be sturdy but it is equally important that bowing and racking be minimized, as well as fluid leakage between the several parts of the construction.

SUMMARY OF THE INVENTION

The present invention provides a new, useful and unobvious filter frame construction which lends itself to straight-forward and economical assembly and handling, minimizing past problems of bowing, edge damage, cutting, wear and fluid leakage, and, at the same time, insuring positive maintenance of the fluid treating filter medium within the support frame.

Various other features of the present invention will become obvious to one skilled in the art upon reading the disclosure set forth herein.

More particularly, the present invention provides a unit filter assembly comprising: a filter frame including upstream and downstream edges defining open upstream and downstream faces to permit fluid flow therethrough; a filter medium disposed within the frame transverse the direction of fluid flow between the upstream and downstream faces; a border flange for the filter frame, the border flange having a base portion and a pair of opposed inner and outer leg portions extending therefrom, the base portion being of a breadth greater than the thickness of the filter frame to abut against the edge thereof and extend outwardly from the outer surface of the frame with the outer leg portion of the flange extending in spaced substantially parallel relation to the outer surface of the filter frame and the inner leg portion abutting against the inner surface of the filter frame, the inner leg portion of the border flange having a terminal filter medium restraining portion extending normal therefrom to restrain the periphery of the face of the filter medium disposed in the filter frame; and clamp means resiliently wedged between the outer leg portion of the border flange and the outer surface of the filter frame to maintain the border flange in fixed position on the filter frame.

It is to be understood that various changes can be made in the arrangement, form and construction of the apparatus set forth herein without departing from the scope or spirit of the present invention.

Referring to the drawings which disclose one advantageous embodiment of the present invention:

FIG. 5 is an enlarged plan view of a novel border flange prior to assembly;

FIG. 6 is a cross-sectional view taken in a plane through line 6—6 of FIG. 5; and, FIG. 7 is an isometric end view looking toward the rear of a novel border flange corner prior to assembly.

Figure 1:
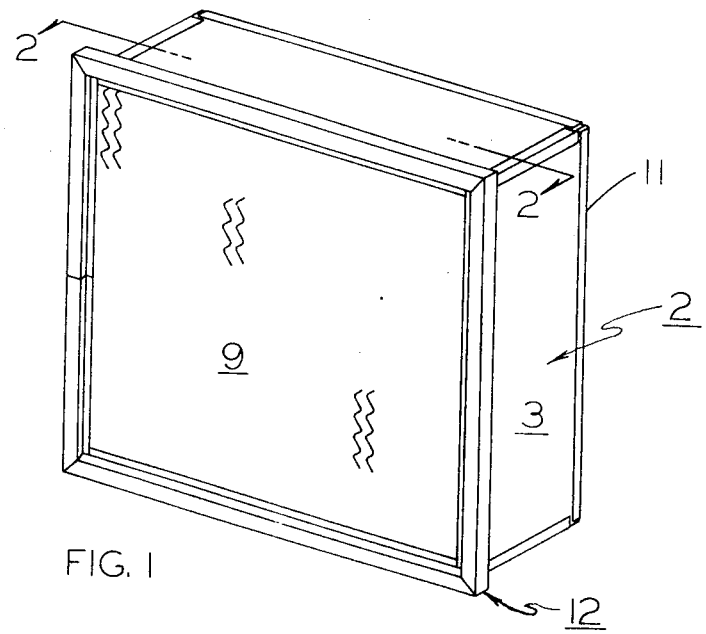
FIG. 1 is an isometric view of the unit filter assembly incorporating the novel features of the present invention.

Referring to FIG. 1 in the drawings, rectangular filter assembly 2 is disclosed. Filter assembly 2 includes rectangular filter frame 3 which serves to support filter medium 4 therein. As shown in the drawings, the filter medium is in the form of a sheet extending back and forth in pleated fashion upon itself to be transverse the fluid stream to be treated with the walls of the pleats of filter medium being held in spaced relationship from each other by corrugated spacer members 7. Such type of filter assemblies are generally known in the art and therefore the assembly of the filter medium within the frame itself is not disclosed in detail. Assemblies of this type are most commonly used where high filtering efficiencies are desired, providing a maximum amount of filter medium in a given space.

Filter frame 3 can be made from any one of a number of suitably rigid materials and advantageously pressed fiber board materials can be used. A suitable sealant 8 is utilized between the edges of filter medium 4, spacer members 7 and the inner surface of filter frame 3 to prevent fluid leakage therearound.

The upstream and downstream edges of frame 3 define open upstream and downstream faces 9 and 11 to permit flow of the fluid stream to be treated therethrough. To protect the edge of frame 3 and to prevent bowing of the frame, a novel border flange 12 of the present invention is utilized. Border flange 12 disclosed in FIG. 5 in unassembled form can be fabricated by roll forming from an integral blank of suitable hard, wear-resistant, flexible material, such as a galvanized sheet metal. Flange 12 is provided with a base portion 13 and a pair of opposed inner and outer leg portions 14 and 16 respectively, which leg portions 14 and 16 are turned to extend normal to the base portion 13 in parallel relationship to each other. Base portion 13 is of a breadth greater than the thickness of filter frame 3. Accordingly, when border flange 12 is assembled to frame 3, (FIG. 4) base portion 13 is arranged to abut against the edge of frame 3 and extend outwardly from the outer surface of the frame with the outer leg portion 16 extending in spaced substantially parallel relation to the outer surface of frame 3. The inner leg portion 14 abuts against the inner surface of frame 3. It is to be noted that inner leg portion 14 has integral therewith a terminal filter medium restraining portion 17 which extends normal therefrom. This terminal restraining portion 17 abuts against the peripheral edge face of folded filter medium 4 serving to restrain the same and at the same time further assuring against possible fluid leakage between the filter medium edges and the inner surface of frame 3.

Referring to FIG. 5 - 7 of the drawings, it can be seen that border flange 12 can be formed from one integral piece of material including normally positioned adjacent side sections 15 of the rectangular frame 12 with the outer leg portion 16 being integral to form corner 21 therebetween. The base portion 13, the inner leg portion 14 and the terminal portion 17 are cut away at 22 adjacent corners 21 to permit the bending and normal positioning of the sections 15 to form the rectangular frame with the extremities 23 of the terminal restraining portions 17 overlapping with one extremity edge of one section thereof abutting against the inner leg portion 14 of the adjacent section.

Figure 2:
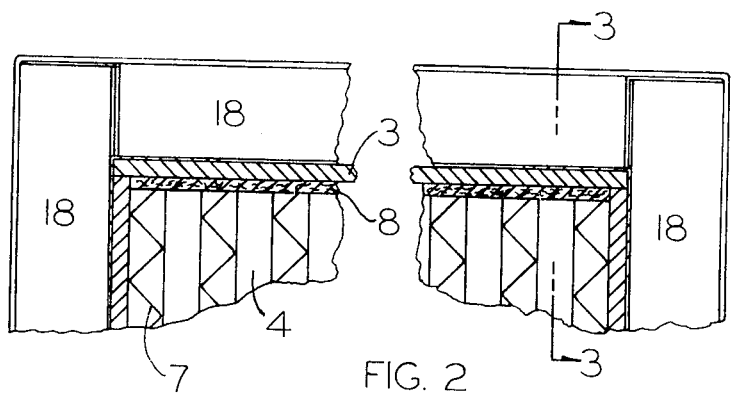
FIG. 2 is an enlarged, partially broken-away cross-sectional view of a portion of the filter assembly of FIG. 1, taken in a plane through line 2—2 of FIG. 1 looking toward the rear of the novel border flange of the present invention.
Figure 3:
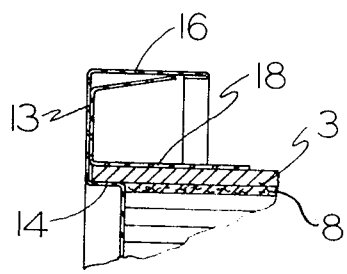
FIG. 3 is a cross-sectional view of a corner of the apparatus of FIGS. 1 and 2 taken in a plane through line 3—3 of FIG. 2.
Figure 4:
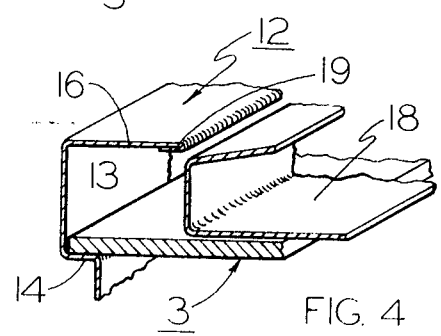
FIG. 4 is an isometric exploded view of a portion of the apparatus of the previous figures disclosing the manner in which the clamp means is utilized to assemble the border flange to the filter frame.

As can be seen in FIG. 2 and FIG. 4 of the drawings, a suitable clamp means in the form of channel bars 18 are provided to clamp border flange 12 to frame 3. Channel bars 18 which can be formed from a suitable resilient galvanized metal material, are sized to wedge between the outer leg portion 16 of the border flange 12 and the outer surface of filter frame 3 to firmly hold the flange in position on the frame, increasing the sturdiness of the frame, compensating for any thickness differences in frame 3, and further insuring against leakage. In this regard, it is to be noted that when the frame is made from one complete section, one of the clamp bars 18 further serves as a leakage guard where the ends of the sections are joined. It is further to be noted that the outer leg 16 of the filter flange can be folded upon itself as at 19 (FIG. 4), to restrain the bars 18 in position when inserted between the outer leg 16 and the surface of filter frame 3.

From the above description it readily can be seen that a straight-forward, economical filter frame assembly is provided which is sufficiently sturdy to prevent the assembly from racking and bowing and which is so constructed as to minimize leakage.

The invention claimed is:

1. A unit filter assembly comprising: a filter frame including upstream and downstream edges defining open upstream and downstream faces to permit fluid flow therethrough; a filter medium disposed within said frame transverse the direction of fluid flow between said upstream and downstream faces; a border flange for said filter frame, said border flange having a base portion and a pair of opposed inner and outer leg portions extending therefrom, said base portion being of a breadth greater than the thickness of said filter frame to abut against the edge thereof and extend outwardly from the outer surface of said filter frame with the outer leg portion of said flange extending in spaced substantially parallel relation to said outer surface of said filter frame and the inner leg portion abutting against the inner surface of said filter frame, said inner leg portion of said border flange having a terminal filter medium restraining portion extending normal therefrom to restrain the periphery of the face of said filter medium disposed in said filter frame; and clamp means resiliently wedged in the space between the outer leg portion of said border flange and the outer surface of said filter frame to maintain said border flange in fixed position on said filter frame.

2. The apparatus of claim 1, said filter frame being of rectangular configuration, said border flange including normally positioned adjacent frame side sections with the outer leg portion thereof being integral to form a frame corner therebetween, said base, inner leg and terminal restraining portions being cut away adjacent said frame corner to permit the normal positioning of said frame side sections with the extremities of said terminal restraining portions overlapping with one extremity edge of one section abutting against the inner leg portion of an adjacent section.

3. The apparatus of claim 1, said clamp means being of channel bar shape, sized to resiliently wedge between said outer leg portion of said border flange and the outer surface of said filter frame.

4. The apparatus of claim 3, said outer leg portion of said filter flange being folded upon itself to restrain said clamp means in position.

* * * * *